(12) United States Patent
Kim et al.

(10) Patent No.: US 7,240,505 B2
(45) Date of Patent: Jul. 10, 2007

(54) COGENERATION SYSTEM

(75) Inventors: Cheol Min Kim, Anyang-si (KR); Cheol Soo Ko, Kunpo-si (KR); Sim Bok Ha, Kwangmyung-si (KR); Baik Young Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 122 days.

(21) Appl. No.: 11/155,467

(22) Filed: Jun. 20, 2005

(65) Prior Publication Data

US 2006/0123820 A1 Jun. 15, 2006

(30) Foreign Application Priority Data

Dec. 10, 2004 (KR) .................. 10-2004-0104378

(51) Int. Cl.
*F25B 27/00* (2006.01)

(52) U.S. Cl. ..................... 62/238.7; 62/324.1

(58) Field of Classification Search .............. 62/115, 62/160, 236, 238.7, 324.1, 434, 324.6; 165/240
See application file for complete search history.

(56) References Cited

U.S. PATENT DOCUMENTS

| | | | | |
|---|---|---|---|---|
| 5,607,013 A | * | 3/1997 | Inoue et al. | ............... 165/207 |
| 6,050,083 A | * | 4/2000 | Meckler | ............... 60/39.182 |
| 6,290,142 B1 | * | 9/2001 | Togawa et al. | ............... 237/12.1 |
| 6,324,849 B1 | * | 12/2001 | Togawa et al. | ............... 60/616 |
| 6,435,420 B1 | * | 8/2002 | Kasai et al. | ............... 237/12.1 |
| 6,519,946 B2 | * | 2/2003 | Iwamoto et al. | ............... 60/784 |
| 6,630,816 B2 | * | 10/2003 | Kotani et al. | ............... 322/37 |
| 6,989,135 B2 | * | 1/2006 | Kennedy | ............... 422/198 |

FOREIGN PATENT DOCUMENTS

| | | |
|---|---|---|
| EP | 1045127 A2 | * 10/2000 |
| JP | 2002-364918 A | * 12/2002 |

* cited by examiner

*Primary Examiner*—Mohammad M. Ali
(74) *Attorney, Agent, or Firm*—Birch, Stewart, Kolasch & Birch, LLP (57) ABSTRACT

A cogeneration system including a heat pump type air conditioner including an outdoor heat exchanger and an outdoor heat exchanger bypass conduit, and a cogeneration unit including a second outdoor heat exchanger, an outdoor heat exchanger bypass conduit, second outdoor heat exchanger connecting conduits, and second outdoor heat exchanger bypass conduit to cause the refrigerant to be evaporated in the second outdoor heat exchanger during a heating operation of the heat pump type air conditioner, and to cause the refrigerant to be condensed in the outdoor heat exchanger during a cooling operation of the heat pump type air conditioner, so that the heat pump type air conditioner can provide a constant heating capacity irrespective of a variation in outdoor temperature during the heating operation thereof.

23 Claims, 5 Drawing Sheets

COGENERATION SYSTEM

BACKGROUND OF THE INVENTION

1. Field of the Invention

The present invention relates to a cogeneration system in which waste heat of a drive source such as an engine is used in a heat pump type air conditioner, and, more particularly, to a cogeneration system which includes a heat pump type air conditioner having a simple inner configuration while achieving an enhancement in heating performance.

2. Description of the Related Art

Figure 1:
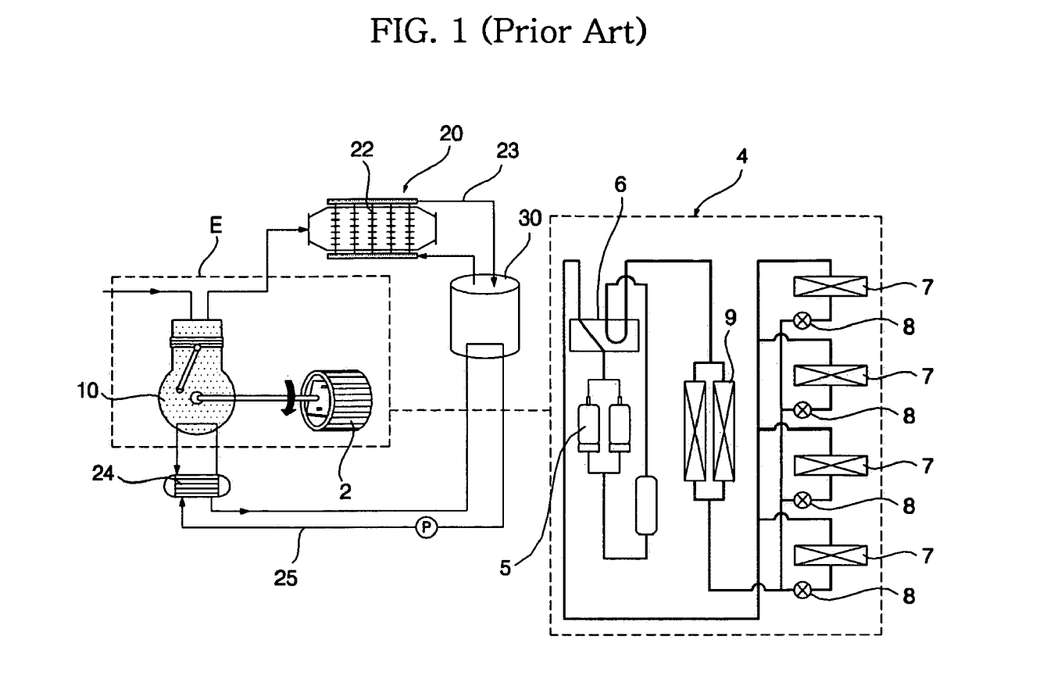
FIG. 1 is a schematic view illustrating a conventional cogeneration system.

FIG. 1 is a schematic view illustrating a conventional cogeneration system.

As shown in FIG. 1, the conventional cogeneration system includes a generator 2 to generate electricity, a drive source 10, which operates to drive the generator 2, and generates waste heat during the operation thereof, such as an engine (hereinafter, the drive source 10 will be referred to as an "engine"), a waste heat recoverer 20 to recover waste heat generated from the engine 10, and a heat consumer 30 to use the waste heat recovered by the waste heat recoverer 20, such as a thermal storage tank.

The electricity generated from the generator 2 is supplied to various electric home appliances including the heat pump type air conditioner 4 and various home illumination devices.

The generator 2 and engine 10 are disposed in an engine room E defined in a chassis (not shown), which is constructed separately from the heat consumer 30.

The heat pump type air conditioner 4 includes compressors 5, a 4-way valve 6, indoor heat exchangers 7, expansion devices 8, and outdoor heat exchangers 9.

When the heat pump type air conditioner 4 operates in a cooling mode, each compressor 5 compresses a refrigerant introduced thereinto. The compressed refrigerant passes through the 4-way valve 6, outdoor heat exchangers 9, expansion devices 8, indoor heat exchangers 7, and 4-way valve 6, in this order, and returns to the compressors 5. In this case, each outdoor heat exchanger 9 functions as a condenser, and each indoor heat exchanger 7 functions as an evaporator to absorb heat from indoor air.

On the other hand, when the heat pump type air conditioner operates in a heating mode, the refrigerant compressed in each compressor 5 passes through the 4-way valve 6, indoor heat exchangers 7, expansion devices 8, outdoor heat exchangers 9, and 4-way valve 6, in this order, and returns to the compressors 9. In this case, each outdoor heat exchanger 9 functions as an evaporator, and each indoor heat exchanger 7 functions as a condenser to heat indoor air.

The waste heat recoverer 20 includes an exhaust gas heat exchanger 22 to absorb heat from exhaust gas discharged from the engine 10, and a cooling water heat exchanger 24 to absorb heat from cooling water used to cool the engine 10.

The exhaust gas heat exchanger 22 is connected with the heat consumer 30 via a first heat supply line 23. Accordingly, the exhaust gas heat exchanger 22 can transfer the waste heat absorbed from the exhaust gas of the engine 10 to the heat consumer 30 via the first heat supply line 23. As mentioned above, the heat consumer 30 may be a thermal storage tank.

The cooling water heat exchanger 24 is connected with the heat consumer 30 via a second heat supply line 24. Accordingly, the cooling water heat exchanger 24 can transfer the waste heat absorbed from the cooling water of the engine 10 to the heat consumer 30 via the second heat supply line 24.

Meanwhile, where the above-mentioned cogeneration system is configured such that the waste heat of the engine 10 is recovered to be supplied to the heat pump type air conditioner 4 during a heating operation of the heat pump type air conditioner 4, it is possible to achieve an enhancement in the heating efficiency of the heat pump type air conditioner 4.

For example, the cogeneration system may be configured to include an additional outdoor heat exchanger (hereinafter, referred to as a "second outdoor heat exchanger") disposed in the engine room E to receive waste heat recovered by the exhaust gas heat exchanger 22 and cooling water heat exchanger 24 such that the refrigerant compressed in each compressor 5 is circulated through the indoor heat exchangers 7, expansion devices 8, second outdoor heat exchanger, 4-way valve 6, and compressors 5, in this order, during the heating operation of the heat pump type air conditioner 4, and is circulated through the 4-way valve 6, the outdoor heat exchangers 9, expansion devices 8, indoor heat exchangers 7, 4-way valve 6, and compressors 5, in this order, during the cooling operation of the heat pump type air conditioner 4. In this case, the heat pump type air conditioner 4 can provide a constant heating capacity irrespective of a variation in outdoor temperature when the heat pump type air conditioner 4 operates in the heating mode, and can provide a desired cooling capacity when the heat pump type air conditioner 4 operates in the cooling mode.

In this case, however, the cogeneration system must include at least two bypass conduits and at least two bypass valves, in order to establish a refrigerant bypass path. Although the bypass conduits and bypass valves are typically arranged in the heat pump type air conditioner 4, they cause the heat pump type air conditioner 4 to have a complex inner configuration and an increased size.

SUMMARY OF THE INVENTION

The present invention has been made in view of the above-mentioned problems, and it is an object of the invention to provide a cogeneration system configured to efficiently drive a heat pump type air conditioner, using waste heat of a drive source adapted to drive a generator, and to simplify the inner configuration of the heat pump type air conditioner.

In accordance with the present invention, this object is accomplished by providing a cogeneration system comprising: a heat pump type air conditioner including a compressor, a 4-way valve, an indoor heat exchanger, an expansion device, and an outdoor heat exchanger; a cogeneration unit including a generator, a drive source, a waste heat recoverer, and second outdoor heat exchangers; an outdoor heat exchanger bypass conduit arranged in the heat pump type air conditioner; second outdoor heat exchanger connecting conduits, each of which connects the heat pump type air conditioner and an associated one of the second outdoor heat exchangers; and a second outdoor heat exchanger bypass conduit arranged between portions of the second outdoor heat exchanger connecting conduits, which are disposed in the cogeneration unit.

The heat pump type air conditioner may further include a linear expansion valve arranged between an inlet of the outdoor heat exchanger bypass conduit and the outdoor heat exchanger to prevent a refrigerant, which is expanded in the expansion device, from entering the outdoor heat exchanger during a heating operation of the heat pump type air conditioner, and to cause the refrigerant, which emerges from the outdoor heat exchanger, to be introduced into the expansion device after being expanded during a cooling operation of the heat pump type air conditioner.

The heat pump type air conditioner may further include a check valve arranged between an inlet of the outdoor heat exchanger bypass conduit and the outdoor heat exchanger to prevent a refrigerant, which is expanded in the expansion device, from entering the outdoor heat exchanger during a heating operation of the heat pump type air conditioner, and to cause the refrigerant, which emerges from the outdoor heat exchanger, to be introduced into the expansion device during a cooling operation of the heat pump type air conditioner.

The heat pump type air conditioner may further include a control valve arranged between an outlet of the outdoor heat exchanger bypass conduit and the outdoor heat exchanger to prevent a refrigerant, which emerges from the outdoor heat exchanger bypass conduit, from flowing backward to the outdoor heat exchanger during a heating operation of the heat pump type air conditioner, and to cause the refrigerant, which enters the heat pump type air conditioner to be introduced into the outdoor heat exchanger.

The control valve may be closed when a predetermined time elapses after the heating operation of the heat pump type air conditioner begins, to recover the refrigerant, which remains in the outdoor heat exchanger during the heating operation of the heat pump type air conditioner.

An outdoor heat exchanger bypass valve may be arranged at the outdoor heat exchanger bypass conduit to open the outdoor heat exchanger bypass conduit during a heating operation of the heat pump type air conditioner, and to close the outdoor heat exchanger bypass conduit during a cooling operation of the heat pump type air conditioner.

A linear expansion valve may be arranged between an inlet of the outdoor heat exchanger bypass conduit and the outdoor heat exchanger bypass valve.

Second outdoor heat exchanger bypass valves may be arranged at the second outdoor heat exchanger connecting conduits, to open the second outdoor heat exchanger connecting conduits, during a heating operation of the heat pump type air conditioner, respectively, and to prevent a refrigerant from being introduced into the second outdoor heat exchangers, respectively.

The second outdoor heat exchanger bypass valves may be arranged at portions of the second outdoor heat exchanger connecting conduits, which are disposed in the cogeneration unit, respectively.

The cogeneration unit may further include a control valve arranged at the second outdoor heat exchanger bypass conduit to close the second outdoor heat exchanger bypass conduit during a heating operation of the heat pump type air conditioner, and to open the second outdoor heat exchanger bypass conduit during a cooling operation of the heat pump type air conditioner.

The heat pump type air conditioner may further include an indoor unit, in which the indoor heat exchanger is arranged, and an outdoor unit, in which the compressor, the 4-way valve, the outdoor heat exchanger, and the outdoor heat exchanger bypass conduit are arranged.

Each of the indoor heat exchanger, the indoor unit, and the expansion device may comprise a plurality of ones. The plurality of expansion devices are arranged in a distributor.

The cogeneration system may further comprise an outdoor fan to blow outdoor air to the outdoor heat exchanger during a heating operation of the heat pump type air conditioner.

The cogeneration unit of the cogeneration system according to the present invention includes the second outdoor heat exchangers, the outdoor heat exchanger bypass conduit to cause the refrigerant to be evaporated in the second outdoor heat exchangers during the heating operation of the heat pump type air conditioner, and the second outdoor heat exchanger bypass conduit to cause the refrigerant to be condensed in the outdoor heat exchangers during the cooling operation of the heat pump type air conditioner. Accordingly, the heat pump type air conditioner can provide a constant heating capacity irrespective of a variation in outdoor temperature during the heating operation of the heat pump type air conditioner. Also, since only the outdoor heat exchanger bypass conduit is arranged in the heat pump type air conditioner, and the second outdoor heat exchanger bypass conduit is arranged in the cogeneration unit, there is an advantage in that the heat pump type air conditioner has a simple inner configuration.

Also, the cogeneration system of the present invention has an advantage in that the valve arrangement to prevent the refrigerant from passing through the outdoor heat exchangers during the heating operation of the heat pump type air conditioner is simple because the linear expansion valve or check valve is arranged between the branching point of the outdoor heat exchanger bypass conduit and the outdoor heat exchangers.

The cogeneration system of the present invention has advantages in that it is possible to simplify the inner configuration of the heat pump type air conditioner, and to manage and repair the second outdoor heat exchanger bypass valve because the second outdoor heat exchanger bypass valve is arranged at the second outdoor heat exchanger connecting conduit, in particular, at the portion of the second outdoor heat exchanger connecting conduit, which is disposed in the cogeneration unit.

In the cogeneration system of the present invention, the cogeneration unit includes the control valve arranged at the second outdoor heat exchanger bypass conduit to close the second outdoor heat exchanger bypass conduit during the heating operation of the heat pump type air conditioner, and to open the second outdoor heat exchanger bypass conduit during the cooling operation of the heat pump type air conditioner. Since the control valve is arranged in the cogeneration unit, it is possible to simplify the inner configuration of the heat pump type air conditioner, and to manage and repair the control valve.

In addition, in the cogeneration system according to the present invention, since the outdoor fan to blow outdoor air to the outdoor heat exchangers during the heating operation of the heat pump type air conditioner, it is possible to minimize noise generated during the rotation of the outdoor fan.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Hereinafter, exemplary embodiments of a cogeneration system according to the present invention will be described with reference to the annexed drawings. In the following description, identical elements are referred to by the same title and designated by the same reference numeral, without any redundant description thereof.

Figure 2:
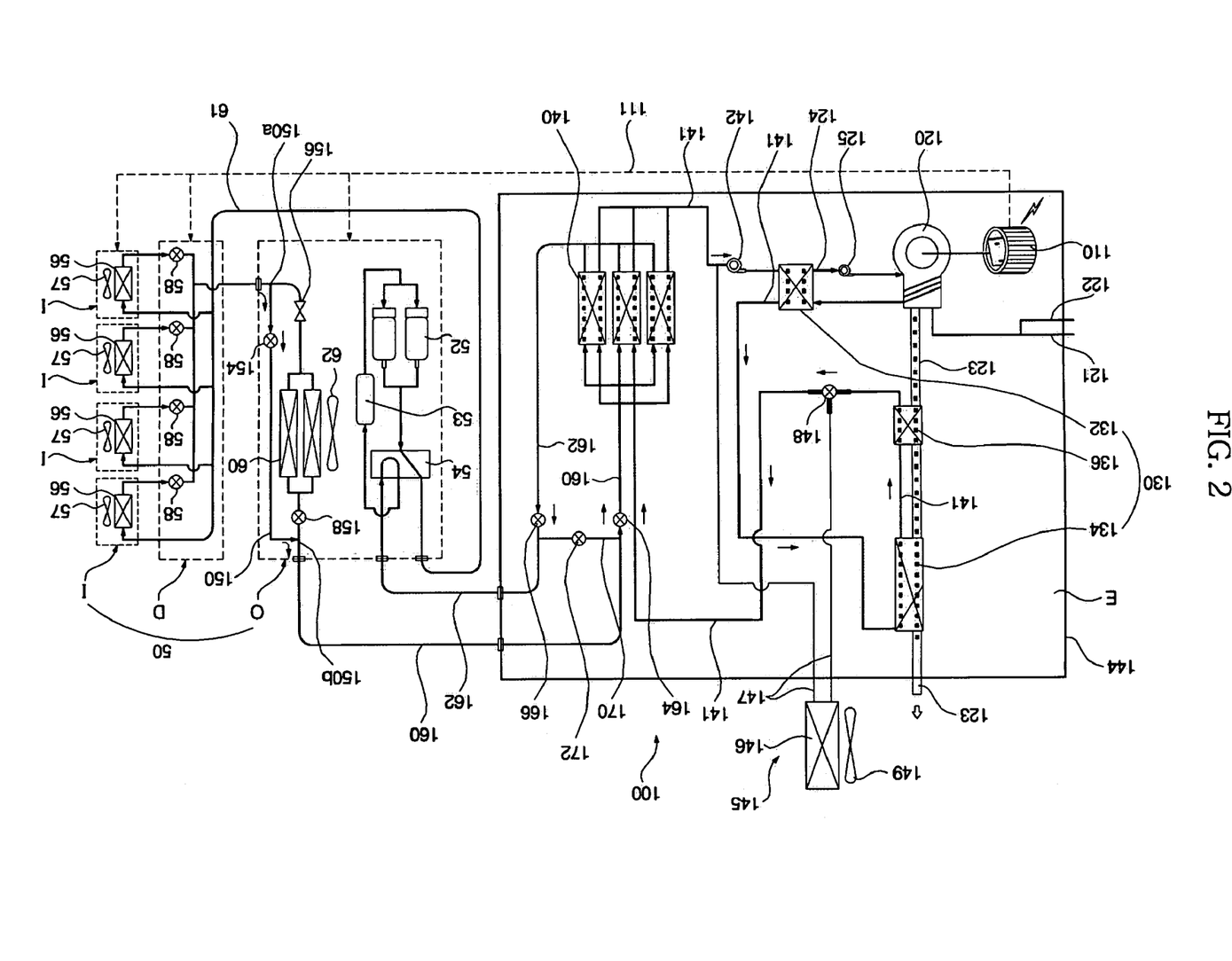
FIG. 2 is a schematic diagram of a cogeneration system according to a first embodiment of the present invention, illustrating a refrigerant flow and a waste heat flow generated during a heating operation of a heat pump type air conditioner included in the cogeneration system.
Figure 3:
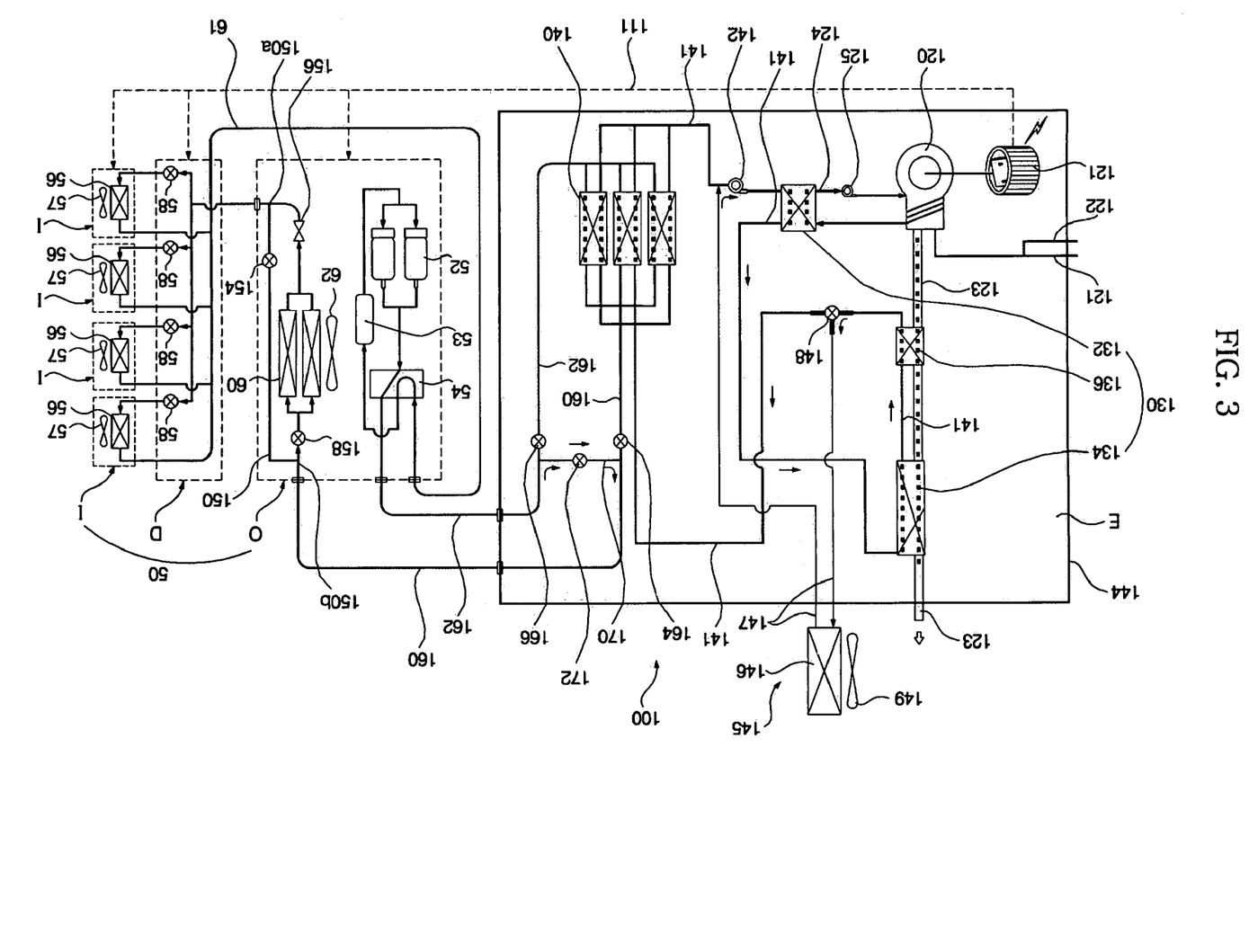
FIG. 3 is a schematic diagram of the cogeneration system according to the first embodiment of the present invention, illustrating a refrigerant flow and a waste heat flow generated during a cooling operation of the heat pump type air conditioner.

FIG. 2 is a schematic diagram of a cogeneration system according to a first embodiment of the present invention, illustrating a refrigerant flow and a waste heat flow generated during a heating operation of a heat pump type air conditioner included in the cogeneration system. FIG. 3 is a schematic diagram of the cogeneration system according to the first embodiment of the present invention, illustrating a refrigerant flow and a waste heat flow generated during a cooling operation of the heat pump type air conditioner.

As shown in FIGS. 2 and 3, the cogeneration system according to this embodiment mainly includes a heat pump type air conditioner 50, and a cogeneration unit 100.

The heat pump type air conditioner 50 includes compressors 52, a 4-way valve 54, indoor heat exchangers 56, expansion devices 58, and outdoor heat exchangers 60.

The compressors 52, 4-way valve 54, indoor heat exchangers 56, expansion devices 58, and outdoor heat exchangers 60 are connected by a refrigerant conduit 61.

An accumulator 53 is arranged at a suction conduit, to which the compressors 52 are connected to suck a refrigerant from the suction conduit. The accumulator 53 accumulates a liquid portion of the refrigerant passing through the suction conduit.

The 4-way valve 54 controls an inner refrigerant path established in the heat pump type air conditioner 50 to guide the refrigerant compressed by the compressors 52 to the indoor heat exchangers 56 during the heating operation of the heat pump type air conditioner 50, as shown in FIG. 2, and to guide the refrigerant compressed by the compressors 52 to the outdoor heat exchangers 60, as shown in FIG. 3.

An indoor fan 57 is arranged near each indoor heat exchanger 56 to blow indoor air to the indoor heat exchanger 56.

Each expansion device 58 comprises a capillary tube or a linear expansion valve (LEV). The following description will be given only in conjunction with the case in which each expansion device 58 comprises an LEV.

An outdoor fan 62 is arranged near the outdoor heat exchangers 60 to blow outdoor air to the outdoor heat exchangers 60.

The compressors 52, 4-way valve 54, and outdoor heat exchangers 60 constitute an outdoor unit O of the heat pump type air conditioner 50.

The indoor heat exchangers 56 constitute respective indoor units I of the heat pump type air conditioner 50.

Although the heat pump type air conditioner 50 includes a plurality of indoor heat exchangers 56, and thus, a plurality of indoor units I, and a plurality of expansion devices 58, a single heat exchanger 56, and thus, a single indoor unit I, and a single expansion device 58 may be used. The following description will be given only in conjunction with the case in which a plurality of indoor heat exchangers 56, and thus, a plurality of indoor units I, and a plurality of expansion devices 58 are used.

The expansion devices 58 constitute a distributor D.

The cogeneration unit 100 includes a generator 110, a drive source 120, a waste heat recoverer 130, and second outdoor heat exchangers 140.

The generator 110 may be an AC generator or a DC generator. The generator 110 includes a rotor coupled to an output shaft of the drive source 120 so that the generator 110 generates electricity during rotation of the output shaft.

The generator 110 is coupled to the heat pump type air conditioner 50 via a power line 111, so as to supply the generated electricity to the heat pump type air conditioner 50 via the power line 111.

The drive source 120 comprises a fuel cell or an engine, which operates using fuel such as liquefied gas or liquefied petroleum gas. The following description will be given only in conjunction with the case in which the drive source 120 comprises an engine.

A fuel supply tube 121, an air supply tube 122, and an exhaust tube 123 are connected to the engine 120. The fuel supply tube 121 is adapted to supply fuel such as liquefied gas or liquefied petroleum gas to the engine 120. The air supply tube 122 is joined to the fuel supply tube 121 to supply air to the engine 120. The exhaust tube 123 is adapted to discharge exhaust gas generated from the engine 120.

The waste heat recoverer 130 includes a cooling water heat exchanger 132 connected to the engine 120 via a cooling water line 124 to recover heat of cooling water used to cool the engine 120, and exhaust gas heat exchangers 134 and 136 arranged at the exhaust tube 123 to recover heat of exhaust gas discharged from the engine 120.

A cooling water circulation pump 125 is arranged at the engine 120 or cooling water line 124 to cause the cooling water to be circulated through the engine 120 and cooling water heat exchanger 132.

The cooling water heat exchanger 132 and exhaust gas heat exchangers 134 and 136 are connected to the second outdoor heat exchangers 140 via a heat transfer line 141 to transfer the waste heat recovered during the operation of the engine 120 to the second outdoor heat exchangers 140.

A heat medium circulation pump 142 is arranged at the heat transfer line 141 to circulate a heat medium through the cooling water heat exchanger 132, exhaust gas heat exchangers 134 and 136, and second outdoor heat exchangers 140.

The cogeneration unit 100 further includes a chassis 144, in which the generator 110, drive source 120, waste heat recoverer 130, and second outdoor heat exchangers 140 are disposed.

An engine room E is also defined in the chassis 144 to receive the generator 110, drive source 120, waste heat recoverer 130, and second outdoor heat exchangers 140.

The cogeneration unit 100 further includes a radiator 145 to radiate heat recovered by the waste heat recoverer 130.

The radiator 145 includes a radiating heat exchanger 146 to radiate the waste heat of the engine 120 to the atmosphere when the waste heat of the engine 120 is not transferred to the second outdoor heat exchangers 140.

The radiating heat exchanger 146 is installed on the top of the chassis 144 to radiate heat to the atmosphere.

The radiating heat exchanger 146 is connected with a bypass line 147 branched from the heat transfer line 141. A 3-way valve 148 is arranged at the bypass line 147 to change the flow path of the heat medium.

The radiator 145 further includes a radiator fan 149 to blow outdoor air to the radiating heat exchanger 146.

Meanwhile, the cogeneration system further includes an outdoor heat exchanger bypass conduit 150 to guide the refrigerant emerging from the expansion devices 58 in an expanded state to bypass the outdoor heat exchangers 60 during the heating operation of the heat pump type air conditioner 50.

The outdoor heat exchanger bypass conduit 150 is arranged in the heat pump type air conditioner 50.

An outdoor heat exchanger bypass valve 154 is arranged at the outdoor heat exchanger bypass conduit 150 to open the outdoor heat exchanger bypass conduit 150 during the heating operation of the heat pump type air conditioner 50, and to close the outdoor heat exchanger bypass conduit 150 during the cooling operation of the heat pump type air conditioner 50.

Also, the heat pump type air conditioner 50 includes an LEV 156 arranged between a branching point or inlet 150a of the outdoor heat exchanger bypass conduit 150 and the outdoor heat exchangers 60 to prevent the refrigerant emerging from the expansion devices 58 in an expanded state from being introduced into the outdoor heat exchangers 60 during the heating operation of the heat pump type air conditioner 50, and to guide the refrigerant emerging from the outdoor heat exchangers 60 to be introduced into the expansion devices 58 after being expanded.

The heat pump type air conditioner 50 also includes a control valve 158 arranged between a joining point or outlet 150b of the bypass conduit 150 and the outdoor heat exchangers 60 to prevent the refrigerant emerging from the bypass conduit 150 from flowing backward to the outdoor heat exchangers 60 during the heating operation of the heat pump type air conditioner 50, and to guide the refrigerant introduced in the heat pump type air conditioner 50 to enter the outdoor heat exchangers 60 during the cooling operation of the heat pump type air conditioner 50.

The cogeneration system further includes second outdoor heat exchanger connecting conduits 160 and 162, which connect the heat pump type air conditioner 50 and the second outdoor heat exchangers 140, in order to guide the refrigerant bypassed through the outdoor heat exchanger bypass conduit 150 to be introduced into the 4-way valve 54 after passing through the second outdoor heat exchangers 140 during the heating operation of the heat pump type air conditioner 50.

The second outdoor heat exchanger connecting conduit 160 connects the joining point 150b of the outdoor heat exchanger bypass conduit 150 and the second outdoor heat exchangers 140, whereas the second outdoor heat exchanger connecting conduit 162 connects the second outdoor heat exchangers 140 and the 4-way valve 54.

Second outdoor heat exchanger bypass valves 164 and 166 are arranged at respective second outdoor heat exchanger connecting conduits 160 and 162 to open the second outdoor heat exchanger connecting conduits 160 and 162 during the heating operation of the heat pump type air conditioner 50, and to prevent the refrigerant from being introduced into the second outdoor heat exchangers 140 during the cooling operation of the heat pump type air conditioner 50.

In order to simplify the inner configuration of the heat pump type air conditioner 50, the second outdoor heat exchanger bypass valves 164 and 166 are not arranged in the heat pump type air conditioner 50, but are arranged at portions of the second outdoor heat exchanger connecting conduits 160 and 162, which are disposed in the chassis 144 of the cogeneration unit 100.

The cogeneration system further includes a second outdoor heat exchanger bypass conduit 170 connected between the second outdoor heat exchanger connecting conduits 160 and 162 to guide the refrigerant emerging from the 4-way valve 54 to bypass the second outdoor heat exchangers 140 during the cooling operation of the heat pump type air conditioner 50.

In order to simplify the inner configuration of the heat pump type air conditioner 50, the second outdoor heat exchanger bypass conduit 170 is not arranged in the heat pump type air conditioner 50, but is arranged in the chassis 144 of the cogeneration unit 100 between the portions of the second outdoor heat exchanger connecting conduits 160 and 162, which are disposed in the chassis 144 of the cogeneration unit 100.

A control valve 172 is arranged at the second outdoor heat exchanger bypass conduit 170 to close the second outdoor heat exchanger bypass conduit 170 during the heating operation of the heat pump type air conditioner 50, and to open the second outdoor heat exchanger bypass conduit 170 during the cooling operation of the heat pump type air conditioner 50.

Hereinafter, operation of the cogeneration system having the above-described arrangement will be described.

When the engine 120 is driven, the rotor of the generator 110 is rotated, thereby generating electricity. The electricity is supplied to the heat pump type air conditioner 50 and other devices via the power line 111, as shown in FIGS. 2 and 3.

During the operation of the engine 120, waste heat of the exhaust gas of the engine 120 and waste heat of the cooling water of the engine 120 are recovered by the exhaust gas heat exchangers 134 and 136, and the cooling water heat exchanger 132, respectively.

During the heating operation of the heat pump type air conditioner 50, the heat medium circulation pump 142 is driven, and the 3-way valve 148 performs a flow path switching operation to cause the heat medium to flow to the second outdoor heat exchangers 140.

The heat medium in the heat transfer line 141 is pumped by the heat medium circulation pump 142, so that the heat medium is circulated through the cooling water heat exchanger 132, exhaust gas heat exchangers 134 and 136, and second outdoor heat exchangers 140, in this order, as shown in FIG. 2. In this case, heat is transferred from the cooling water heat exchanger 132 and exhaust gas heat exchangers 134 and 136 to the second outdoor heat exchangers 140, so that the second outdoor heat exchangers 140 are heated.

On the other hand, during the heating operation of the heat pump type air conditioner 50, the heat medium circulation pump 142 is driven, and the 3-way valve 148 performs a flow path switching operation to cause the heat medium to flow to the radiating heat exchanger 146. In this case, the radiator fan 149 is also rotated.

As shown in FIG. 3, the heat medium in the heat transfer line 141 is pumped by the heat medium circulation pump 142, so that the heat medium is circulated through the cooling water heat exchanger 132, exhaust gas heat exchangers 134 and 136, and radiating heat exchanger 146, in this order. In this case, heat is transferred from the cooling water heat exchanger 132 and exhaust gas heat exchangers 134 and 136 to the radiating heat exchanger 146 which, in turn, radiates the heat to the atmosphere.

Thus, the waste heat of the engine 120 is used to heat the second outdoor heat exchangers 140 during the heating operation of the heat pump type air conditioner 50, and is discharged to the atmosphere during the heat pump type air conditioner 50.

Meanwhile, when the heat pump type air conditioner 50 operates in the heating mode, the compressors 52 are driven, and the 4-way valve 54 is switched to a heating mode. Also, the outdoor fan 61 is not rotated, the outdoor heat exchanger bypass valve 154 is opened, the control valve 158 of the heat pump type air conditioner 50 is closed, and the LEV 156 is closed. Also, the second outdoor heat exchanger bypass valves 164 and 166 are opened, and the control valve 172 of the cogeneration unit 100 is closed.

The refrigerant compressed in the compressors 52 is introduced into the indoor heat exchanger 56 after passing through the 4-way valve 54. The refrigerant releases heat into indoor air while passing through the indoor heat exchanger 56, so that the refrigerant is condensed. Thereafter, the refrigerant is expanded while passing through the expansion devices 58.

The expanded refrigerant passes through the outdoor heat exchanger bypass conduit 150 without being introduced into the outdoor heat exchangers 60 in accordance with a blocking function of the LEV 156. The refrigerant then passes through the second outdoor heat exchanger connecting conduit 160 without flowing backward toward the outdoor heat exchangers 60 in accordance with a blocking function of the control valve 158 of the heat pump type air conditioner 50.

Subsequently, the refrigerant is fed to the cogeneration unit 100 via the second outdoor heat exchanger connecting conduit 160. The refrigerant fed to the cogeneration unit 100 is introduced into the second outdoor heat exchangers 140 without bypassing the second outdoor heat exchanger bypass conduit 170 in accordance with a blocking function of the control valve 172 of the cogeneration unit 100. Accordingly, the refrigerant is evaporated by receiving heat from the second outdoor heat exchangers 140.

The evaporated refrigerant is again fed to the heat pump type air conditioner 50 via the second outdoor heat exchanger connecting conduit 162 without flowing backward to the second outdoor heat exchanger bypass conduit 170 in accordance with the blocking function of the control valve 172 of the cogeneration unit 100. The refrigerant is then sucked into the compressors 52 after passing through the 4-way valve 54.

The refrigerant sucked into the compressors 52 repeats the above-described circulation, thereby causing the indoor heat exchangers 56 to function as heaters. In this case, the heat pump type air conditioner 50 can provide a constant heating capacity irrespective of a variation in outdoor temperature because the refrigerant is not evaporated in the outdoor heat exchangers 60, but is evaporated in the second outdoor heat exchangers 140.

Meanwhile, in order to recover the refrigerant remaining in the outdoor heat exchangers 60 during the heating operation of the heat pump type air conditioner 50, the control valve 158 of the heat pump type air conditioner 50 is maintained in an opened state for a predetermined time (for example, 1 minute) after the heating operation of the heat pump type air conditioner 50 begins, and is then closed.

On the other hand, when the heat pump type air conditioner 50 operates in the cooling mode, the compressors 52 are driven, and the 4-way valve 54 is switched to a cooling mode. Also, the outdoor fan 61 is rotated, the outdoor heat exchanger bypass valve 154 is closed, the control valve 158 of the heat pump type air conditioner 50 is opened, and the LEV 156 is opened. Also, the second outdoor heat exchanger bypass valves 164 and 166 are closed, and the control valve 172 of the cogeneration unit 100 is opened.

The refrigerant compressed in the compressors 52 is introduced into the second outdoor heat exchanger connecting conduit 162 after passing through the 4-way valve 54. The refrigerant is then fed to the cogeneration unit 100 via the second outdoor heat exchanger connecting conduit 162. The refrigerant fed to the cogeneration unit 100 passes through the second outdoor heat exchanger bypass conduit 170 without being introduced into the second outdoor heat exchangers 140 in accordance with blocking functions of the second outdoor heat exchanger bypass valves 164 and 166.

The refrigerant emerging from the second outdoor heat exchanger bypass conduit 170 is again fed to the heat pump type air conditioner 50 via the second outdoor heat exchanger connecting conduit 160 without flowing backward to the second outdoor heat exchangers 140 in accordance with the blocking functions of the second outdoor heat exchanger bypass valves 164 and 166.

The refrigerant fed to the heat pump type air conditioner 50 is introduced into the outdoor heat exchangers 60 via the control valve 158 of the heat pump type air conditioner 50 without bypassing the outdoor heat exchanger bypass conduit 150 in accordance with a blocking function of the outdoor heat exchanger bypass valve 154.

The refrigerant introduced into the outdoor heat exchangers 60 exchanges heat with air blown by the outdoor fan 61, so that the refrigerant is condensed. The condensed refrigerant is then expanded by the LEV 156.

The refrigerant expanded by the LEV 156 passes through the expansion devices 58 without flowing backward to the outdoor heat exchanger bypass conduit 150 in accordance with the blocking function of the outdoor heat exchanger bypass valve 154, so that the refrigerant is re-expanded by the expansion devices 58.

The refrigerant re-expanded by the expansion devices 58 then exchanges heat with indoor air while passing through the indoor heat exchangers 58, so that the refrigerant is evaporated. The refrigerant is subsequently sucked into the compressors 52 via the 4-way valve 54.

The refrigerant sucked into the compressors 52 repeats the above-described circulation, thereby causing the indoor heat exchangers 56 to function as coolers.

Figure 4:
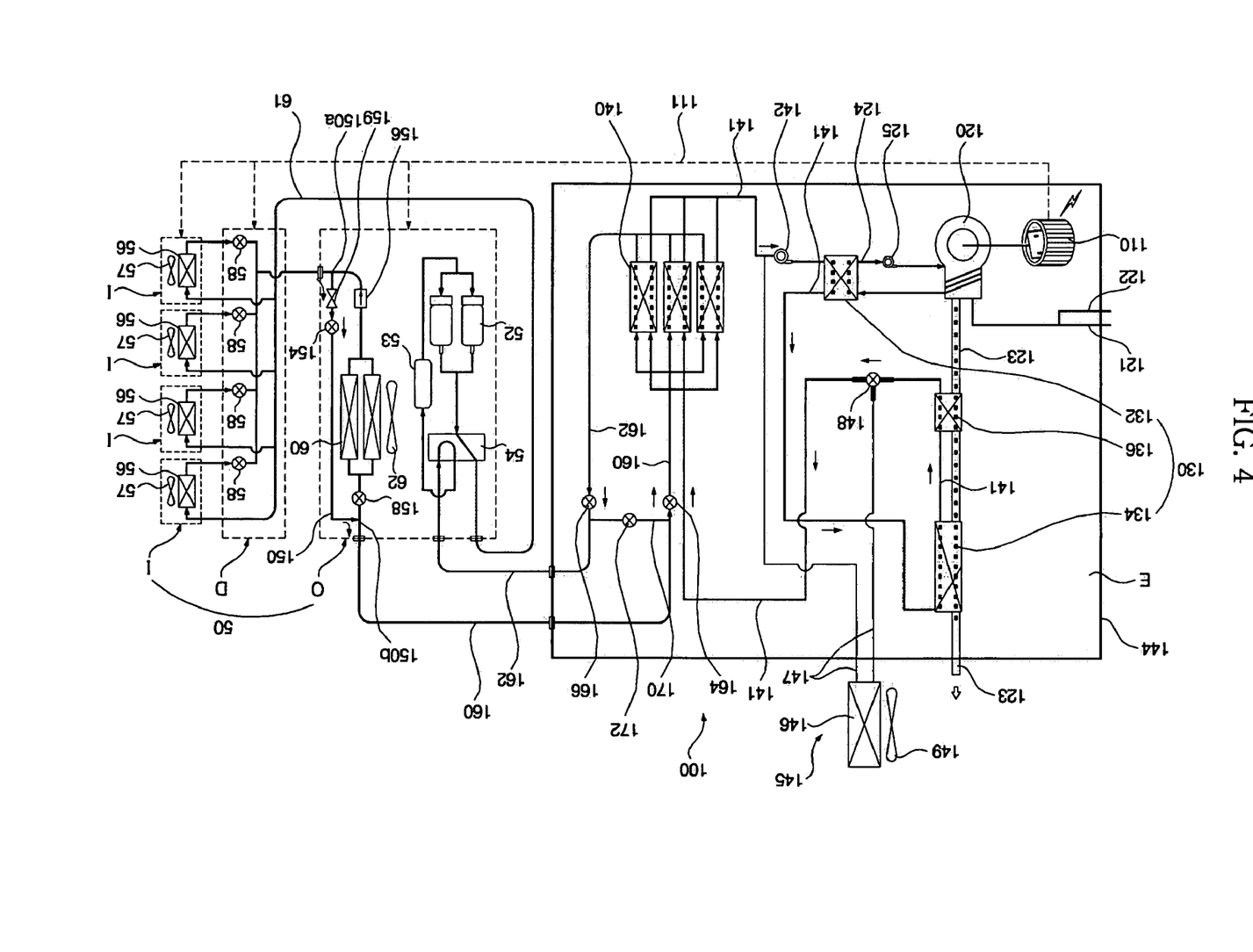
FIG. 4 is a schematic diagram of a cogeneration system according to a second embodiment of the present invention, illustrating a refrigerant flow and a waste heat flow generated during a heating operation of a heat pump type air conditioner included in the cogeneration system.
Figure 5:
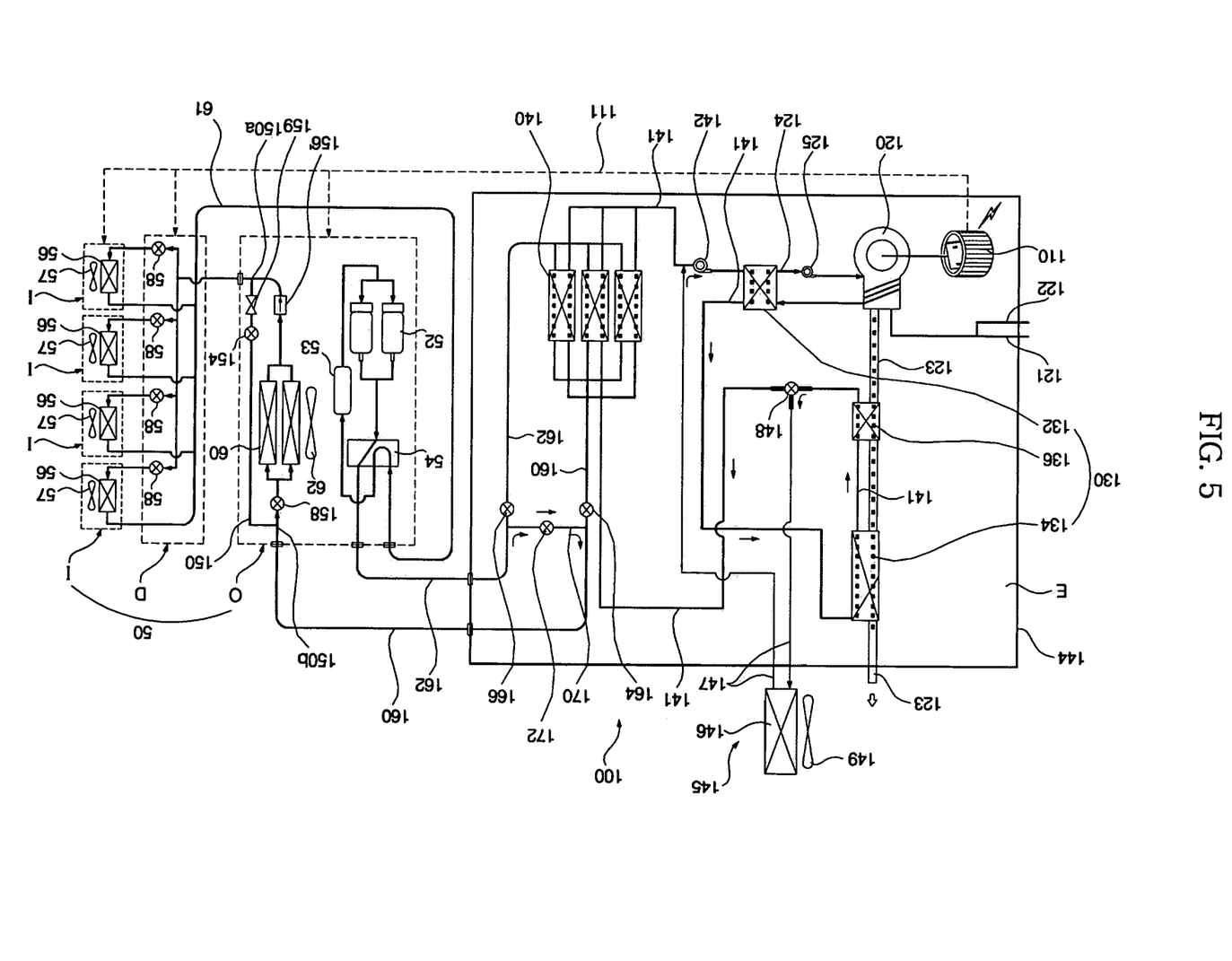
FIG. 5 is a schematic diagram of the cogeneration system according to the second embodiment of the present invention, illustrating a refrigerant flow and a waste heat flow generated during a cooling operation of the heat pump type air conditioner.

FIG. 4 is a schematic diagram of a cogeneration system according to a second embodiment of the present invention, illustrating a refrigerant flow and a waste heat flow generated during a heating operation of a heat pump type air conditioner included in the cogeneration system. FIG. 5 is a schematic diagram of the cogeneration system according to the second embodiment of the present invention, illustrating a refrigerant flow and a waste heat flow generated during a cooling operation of the heat pump type air conditioner.

As shown in FIGS. 4 and 5, the cogeneration system according to this embodiment uses, in place of the LEV according to the first embodiment, a check valve 158' having a structure simpler than the LEV according to the first embodiment, in order to prevent the refrigerant expanded in the expansion devices 58 from being introduced into the outdoor heat exchangers 60 during the heating operation of the heat pump type air conditioner 50, and to guide the refrigerant emerging from the outdoor heat exchanger 60 to be introduced into the expansion devices 58 during the cooling operation of the heat pump type air conditioner 50.

The check valve 158' is arranged between the branching point 150a of the outdoor heat exchanger bypass conduit 150 and the outdoor heat exchangers 60.

In accordance with the second embodiment, an LEV 159 is also arranged between the branching point 150a of the outdoor heat exchanger bypass conduit 150 and the outdoor heat exchanger bypass valve 154.

The cogeneration system of the second embodiment has the same configuration and functions as those of the first embodiment, except that the check valve 158' is used in place of the LEV according to the first embodiment, and the LEV 159 is additionally arranged between the branching point 150a of the outdoor heat exchanger bypass conduit 150 and the outdoor heat exchanger bypass valve 154. Accordingly, the constituent elements of the second embodiment respectively corresponding to those of the first embodiment are designated by the same reference numerals, and no detailed description thereof will be given.

In the cogeneration system according to this embodiment, the refrigerant expanded by the expansion devices 58 during the heating operation of the heat pump type air conditioner 50 is bypassed through the outdoor heat exchanger bypass conduit 150 without being introduced into the outdoor heat exchangers 60 in accordance with a blocking function of the check valve 158'. On the other hand, the refrigerant evaporated in the outdoor heat exchangers 60 during the cooling operation of the heat pump type air conditioner 50 is introduced into the expansion devices 58 after passing through the check valve 158'.

The cogeneration system according to any one of the above-described embodiments of the present invention has various effects.

That is, first, the cogeneration unit of the cogeneration system according to the present invention includes the second outdoor heat exchangers, the outdoor heat exchanger bypass conduit to cause the refrigerant to be evaporated in the second outdoor heat exchangers during the heating operation of the heat pump type air conditioner, and the second outdoor heat exchanger bypass conduit to cause the refrigerant to be condensed in the outdoor heat exchangers during the cooling operation of the heat pump type air conditioner. Accordingly, the heat pump type air conditioner can provide a constant heating capacity irrespective of a variation in outdoor temperature during the heating operation of the heat pump type air conditioner. Also, since only the outdoor heat exchanger bypass conduit is arranged in the heat pump type air conditioner, and the second outdoor heat exchanger bypass conduit is arranged in the cogeneration unit, there is an advantage in that the heat pump type air conditioner has a simple inner configuration.

Second, the cogeneration system of the present invention has an advantage in that the valve arrangement to prevent the refrigerant from passing through the outdoor heat exchangers during the heating operation of the heat pump type air conditioner is simple because the LEV or check valve is arranged between the branching point of the outdoor heat exchanger bypass conduit and the outdoor heat exchangers.

Third, the cogeneration system of the present invention has advantages in that it is possible to simplify the inner configuration of the heat pump type air conditioner, and to manage and repair the second outdoor heat exchanger bypass valve because the second outdoor heat exchanger bypass valve is arranged at the second outdoor heat exchanger connecting conduit, in particular, at the portion of the second outdoor heat exchanger connecting conduit, which is disposed in the cogeneration unit.

Fourth, in the cogeneration system of the present invention, the cogeneration unit includes the control valve arranged at the second outdoor heat exchanger bypass conduit to close the second outdoor heat exchanger bypass conduit during the heating operation of the heat pump type air conditioner, and to open the second outdoor heat exchanger bypass conduit during the cooling operation of the heat pump type air conditioner. Since the control valve is arranged in the cogeneration unit, it is possible to simplify the inner configuration of the heat pump type air conditioner, and to manage and repair the control valve.

Fifth, in the cogeneration system according to the present invention, since the outdoor fan to blow outdoor air to the outdoor heat exchangers during the heating operation of the heat pump type air conditioner, it is possible to minimize noise generated during the rotation of the outdoor fan.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A cogeneration system comprising:
    a heat pump type air conditioner including a compressor, a 4-way valve, an indoor heat exchanger, an expansion device, and an outdoor heat exchanger;
    a cogeneration unit including a generator, a drive source, a waste heat recoverer, and second outdoor heat exchangers;
    an outdoor heat exchanger bypass conduit arranged in the heat pump type air conditioner;
    second outdoor heat exchanger connecting conduits, each of which connects the heat pump type air conditioner and an associated one of the second outdoor heat exchangers; and
    a second outdoor heat exchanger bypass conduit arranged between portions of the second outdoor heat exchanger connecting conduits, which are disposed in the cogeneration unit.

2. The cogeneration system according to claim 1, wherein the heat pump type air conditioner further includes a linear expansion valve arranged between an inlet of the outdoor heat exchanger bypass conduit and the outdoor heat exchanger to prevent a refrigerant, which is expanded in the expansion device, from entering the outdoor heat exchanger during a heating operation of the heat pump type air conditioner, and to cause the refrigerant, which emerges from the outdoor heat exchanger, to be introduced into the expansion device after being expanded during a cooling operation of the heat pump type air conditioner.

3. The cogeneration system according to claim 1, wherein the heat pump type air conditioner further includes a check valve arranged between an inlet of the outdoor heat exchanger bypass conduit and the outdoor heat exchanger to prevent a refrigerant, which is expanded in the expansion device, from entering the outdoor heat exchanger during a heating operation of the heat pump type air conditioner, and to cause the refrigerant, which emerges from the outdoor heat exchanger, to be introduced into the expansion device during a cooling operation of the heat pump type air conditioner.

4. The cogeneration system according to claim 1, wherein the heat pump type air conditioner further includes a control valve arranged between an outlet of the outdoor heat exchanger bypass conduit and the outdoor heat exchanger to prevent a refrigerant, which emerges from the outdoor heat exchanger bypass conduit, from flowing backward to the outdoor heat exchanger during a heating operation of the heat pump type air conditioner, and to cause the refrigerant, which enters the heat pump type air conditioner to be introduced into the outdoor heat exchanger.

5. The cogeneration system according to claim 4, wherein the control valve is closed when a predetermined time elapses after the heating operation of the heat pump type air conditioner begins, to recover the refrigerant, which remains in the outdoor heat exchanger during the heating operation of the heat pump type air conditioner.

6. The cogeneration system according to claim 1, wherein an outdoor heat exchanger bypass valve is arranged at the outdoor heat exchanger bypass conduit to open the outdoor heat exchanger bypass conduit during a heating operation of the heat pump type air conditioner, and to close the outdoor heat exchanger bypass conduit during a cooling operation of the heat pump type air conditioner.

7. The cogeneration system according to claim 6, wherein a linear expansion valve is arranged between an inlet of the outdoor heat exchanger bypass conduit and the outdoor heat exchanger bypass valve.

8. The cogeneration system according to claim 1, wherein second outdoor heat exchanger bypass valves are arranged at the second outdoor heat exchanger connecting conduits, to open the second outdoor heat exchanger connecting conduits, during a heating operation of the heat pump type air conditioner, respectively, and to prevent a refrigerant from being introduced into the second outdoor heat exchangers, respectively.

9. The cogeneration system according to claim 8, wherein the second outdoor heat exchanger bypass valves are arranged at portions of the second outdoor heat exchanger connecting conduits, which are disposed in the cogeneration unit, respectively.

10. The cogeneration system according to claim 1, wherein the cogeneration unit further includes a control valve arranged at the second outdoor heat exchanger bypass conduit to close the second outdoor heat exchanger bypass conduit during a heating operation of the heat pump type air conditioner, and to open the second outdoor heat exchanger bypass conduit during a cooling operation of the heat pump type air conditioner.

11. The cogeneration system according to claim 1, wherein the heat pump type air conditioner further includes:
an indoor unit, in which the indoor heat exchanger is arranged; and
an outdoor unit, in which the compressor, the 4-way valve, the outdoor heat exchanger, and the outdoor heat exchanger bypass conduit are arranged.

12. The cogeneration system according to claim 11, wherein:
each of the indoor heat exchanger, the indoor unit, and the expansion device comprises a plurality of ones; and
the plurality of expansion devices are arranged in a distributor.

13. The cogeneration system according to claim 1, further comprising:
an outdoor fan to blow outdoor air to the outdoor heat exchanger during a heating operation of the heat pump type air conditioner.

14. A cogeneration system comprising:
a heat pump type air conditioner including a compressor, a 4-way valve, an indoor heat exchanger, an expansion device, and an outdoor heat exchanger;
a cogeneration unit including a generator, a drive source, a waste heat recoverer, and second outdoor heat exchangers;
an outdoor heat exchanger bypass conduit arranged in the heat pump type air conditioner;
second outdoor heat exchanger connecting conduits, each of which connects the heat pump type air conditioner and an associated one of the second outdoor heat exchangers;
a second outdoor heat exchanger bypass conduit arranged between portions of the second outdoor heat exchanger connecting conduits, which are disposed in the cogeneration unit;
a linear expansion valve arranged between an inlet of the outdoor heat exchanger bypass conduit and the outdoor heat exchanger;
a control valve arranged between an outlet of the outdoor heat exchanger bypass conduit and the outdoor heat exchanger, for a cooling operation of the heat pump type air conditioner;
an outdoor heat exchanger bypass valve arranged at the outdoor heat exchanger bypass conduit;
second outdoor heat exchanger bypass valves arranged at portions of the second outdoor heat exchanger connecting conduits arranged in the cogeneration unit; and
a control valve arranged at the second outdoor heat exchanger bypass conduit, for a cooling operation of the cogeneration unit.

15. The cogeneration system according to claim 14, wherein the control valve for the cooling operation of the heat pump type air conditioner is closed when a predetermined time elapses after the heating operation of the heat pump type air conditioner begins, to recover the refrigerant, which remains in the outdoor heat exchanger during the heating operation of the heat pump type air conditioner.

16. The cogeneration system according to claim 14, wherein the heat pump type air conditioner further includes:
an indoor unit, in which the indoor heat exchanger is arranged; and
an outdoor unit, in which the compressor, the 4-way valve, the outdoor heat exchanger, and the outdoor heat exchanger bypass conduit are arranged.

17. The cogeneration system according to 16, wherein:
each of the indoor heat exchanger, the indoor unit, and the expansion device comprises a plurality of ones; and
the plurality of expansion devices are arranged in a distributor.

18. The cogeneration system according to claim 14, further comprising:
an outdoor fan to blow outdoor air to the outdoor heat exchanger during a heating operation of the heat pump type air conditioner.

19. A cogeneration system comprising:
a heat pump type air conditioner including a compressor, a 4-way valve, an indoor heat exchanger, an expansion device, and an outdoor heat exchanger;
a cogeneration unit including a generator, a drive source, a waste heat recoverer, and second outdoor heat exchangers;
an outdoor heat exchanger bypass conduit arranged in the heat pump type air conditioner;

second outdoor heat exchanger connecting conduits, each of which connects the heat pump type air conditioner and an associated one of the second outdoor heat exchangers;

a second outdoor heat exchanger bypass conduit arranged between portions of the second outdoor heat exchanger connecting conduits, which are disposed in the cogeneration unit;

a check valve arranged between an inlet of the outdoor heat exchanger bypass conduit and the outdoor heat exchanger;

a control valve arranged between an outlet of the outdoor heat exchanger bypass conduit and the outdoor heat exchanger, for a cooling operation of the heat pump type air conditioner;

an outdoor heat exchanger bypass valve arranged at the outdoor heat exchanger bypass conduit;

second outdoor heat exchanger bypass valves arranged at portions of the second outdoor heat exchanger connecting conduits arranged in the cogeneration unit; and a control valve arranged at the second outdoor heat exchanger bypass conduit, for a cooling operation of the cogeneration unit.

20. The cogeneration system according to claim 19, further comprising:

a linear expansion valve arranged between the inlet of the outdoor heat exchanger bypass conduit and the outdoor heat exchanger bypass valve.

21. The cogeneration system according to claim 19, wherein the heat pump type air conditioner further includes:

an indoor unit, in which the indoor heat exchanger is arranged; and an outdoor unit, in which the compressor, the 4-way valve, the outdoor heat exchanger, and the outdoor heat exchanger bypass conduit are arranged.

22. The cogeneration system according to 19, wherein:

each of the indoor heat exchanger, the indoor unit, and the expansion device comprises a plurality of ones; and the plurality of expansion devices are arranged in a distributor.

23. The cogeneration system according to claim 19, further comprising:

an outdoor fan to blow outdoor air to the outdoor heat exchanger during a heating operation of the heat pump type air conditioner.

* * * * *